Dec. 22, 1931.    W. MORRIS    1,837,571
GREASING DEVICE FOR ANIMALS
Filed March 24, 1930
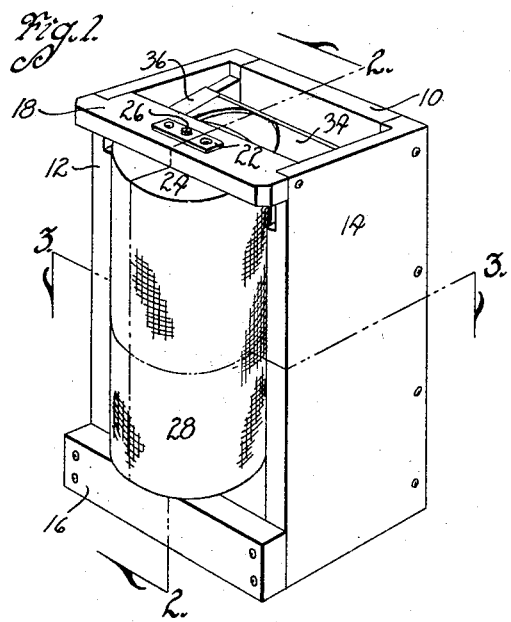
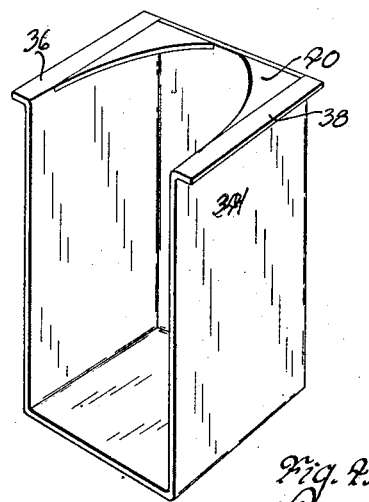
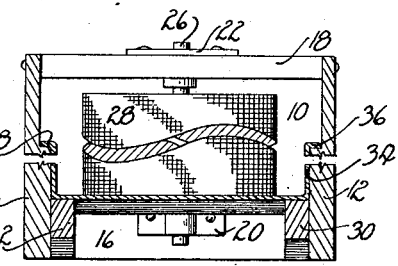
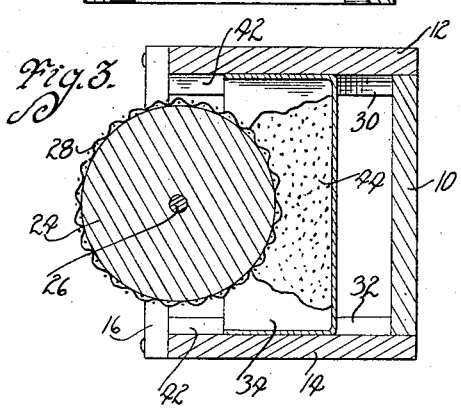
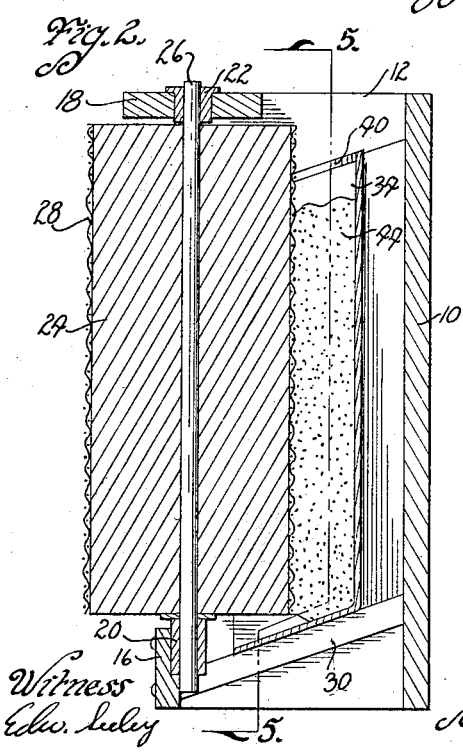
Inventor
Wilfred Morris
by Bair, Freeman & Sinclair
Attorneys Patented Dec. 22, 1931

1,837,571

UNITED STATES PATENT OFFICE

WILFRED MORRIS, OF MINGO, IOWA

GREASING DEVICE FOR ANIMALS

Application filed March 24, 1930. Serial No. 438,453.

The object of this invention is to provide an improved construction for a device for supplying grease or oil to the hides of swine and other livestock.

A further object of the invention is to provide an improved animal greasing device including a rotatable greasing member and a grease container arranged to move toward the greasing member for supplying grease to the latter, which in turn is arranged to transfer the grease to the animals as they rub against it.

Still another object of the invention is to provide an animal greasing device which is economical to manufacture, which is strong and durable, and which is not apt to get out of working order.

With these and other objects in view my invention consists in the construction, arrangement and combination of the various parts of my greasing device for animals, whereby the objects contemplated are attained, as hereinafter more fully set forth, pointed out in my claims, and illustrated in the accompanying drawings, in which:—

Figure 1 is a perspective view of the device.

Figure 2 is a slightly enlarged vertical section on the line 2—2 of Figure 1.

Figure 3 is a horizontal section on the line 3—3 of Figure 1.

Figure 4 is a perspective view of the grease container removed from the casing.

Figure 5 is an interior vertical sectional view on the line 5—5 of Figure 2, portions being broken away to economize space.

I provide a casing which includes a back wall 10 and spaced side walls 12 and 14. The casing may be open at its top and is substantially open at its forward side. It may be constructed of heavy lumber or other suitable material.

The casing is provided at its forward side with a transverse bar 16 connecting the forward edges of the side walls and with a transverse bar 18 at the upper ends of said walls.

The bars 16 and 18 carry vertically aligning bearing members 20 and 22 respectively. A greasing member 24 is rotatably mounted in the forward side of the casing, being provided with a shaft 26 extending therethrough and rotatably engaging in the bearings 20 and 22. The greasing member 24 preferably is a solid cylindrical block of wood or other suitable material, and it has its sides covered with a rough coating 28 which may be composed of screen wire or the like.

The casing is also provided with inclined track members 30 and 32 which are carried by the inner surfaces and at the lower parts of the side walls 12 and 14 and which are inclined forwardly and downwardly toward the lower cross bar 16.

A grease receptacle 34 is formed of sheet metal or the like and is adapted to be mounted in the casing with its bottom resting on the inclined tracks 30 and 32.

The grease receptacle 34 is open at its forward side and is substantially open at its top as clearly shown in Figure 4. If desired, the top margins of the side walls of the receptacle may be extended outwardly to form flanges 36 and 38 and may also be extended inwardly to form a partial cover 40 for the receptacle. The flanges 36 and 38 are arranged to overlie inclined tracks or shoulders 42 formed near the upper ends of the side walls 12 and 14 of the casing. As here shown the tracks or shoulders 42 are formed by rabbeting the upper ends of the side walls.

In use the grease receptacle 34 is moved rearwardly against the rear wall 10 of the casing and is filled or substantially filled with a body of hard oil or grease designated by the numeral 44. The lubricant may be axle grease or any other relatively hard and stiff grease which is suitable for application to the hides of domestic animals such as swine.

On account of the inclined arrangement of the supports for the grease receptacle 34, the tendency is for said receptacle and its contents to move by gravity toward the rotatable greasing member 24. This causes the grease 44 to be pressed against the roughened coating 28 of the member 24 and the character of this coating is such as to accumulate and carry quantities of the grease.

Animals rubbing against the greasing member 24 will cause it to rotate or oscillate and this rubbing movement will, of course, cause portions of the grease carried by the rough coating 28 to be applied to the bodies of the animals.

The receptacle 34 is arranged so that it substantially embraces the greasing member 24 and it is permitted to move toward said member by force of gravity until the supply of grease in the receptacle has been practically exhausted, after which it may be replenished.

The grease 44 which is used in this device is sufficiently stiff that it will not flow readily from the receptacle and the lower cross bar 16 serves to retain any small quantities of grease which may escape from the lower part of the receptacle.

In cold weather the grease 44 may be thinned to the necessary extent by the use of oil so that it will be sufficiently viscous to work properly.

It is obvious that my improved greasing device is inexpensive to manufacture and that it may be built of relatively heavy and strong materials so that it will last indefinitely. There are very few moving parts and consequently there is little tendency for the device to get out of proper working order.

I claim as my invention:—

1. An animal greasing device, comprising a casing open at one side, a greasing member rotatably mounted on a vertical axis at the open side of the casing, said casing being formed with tracks inclined downwardly toward said greasing member, and a grease receptacle slidably supported by said tracks, said receptacle being open at one side for permitting contact of the greasing member with grease carried by the receptacle.

2. An animal greasing device, comprising a casing open at one side, a greasing member rotatably mounted on a vertical axis at the open side of the casing, said greasing member being provided with a roughened surface capable of carrying considerable quantities of grease, said casing being formed with tracks inclined downwardly toward said greasing member, and a grease receptacle slidably supported by said tracks, said receptacle being open at one side for permitting contact of the greasing member with grease carried by the receptacle.

3. An animal greasing device, comprising a casing open at one side, a cylindrical greasing member rotatably mounted on a vertical axis at the open side of the casing, said casing being formed with tracks inclined downwardly toward said greasing member, and a grease receptacle slidably supported by said tracks and adapted to partially embrace said greasing member, said receptacle being open at one side for permitting contact of the greasing member with grease carried by the receptacle.

4. An animal greasing device comprising a casing having a back wall, side walls and an open front, spaced cross bars at the front of said casing, a greasing member rotatably mounted between said cross bars, and a grease receptacle mounted in said casing, said receptacle being arranged to move by force of gravity toward said greasing member to cause contact of said member with grease in the receptacle.

Des Moines, Iowa, March 14, 1930.

WILFRED MORRIS.